Figure 1:
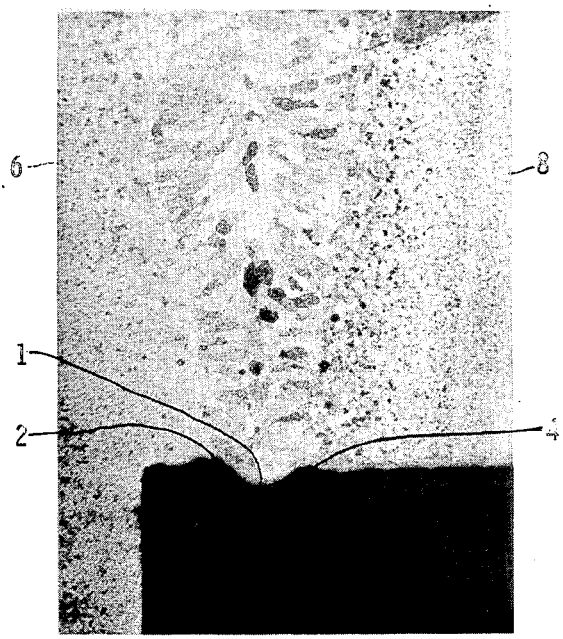

United States Patent

[11] 3,573,424

| [72] | Inventor | Phillip F. Macherey |
| | | Bethel Park, Pa. |
| [21] | Appl. No. | 844,115 |
| [22] | Filed | July 23, 1969 |
| [45] | Patented | Apr. 6, 1971 |
| [73] | Assignee | The United States of America as represented by the United States Atomic Energy Commission |

[54] METHOD FOR REMOVAL OF THE POROUS PORTION OF A BUTT WELD
1 Claim, 2 Drawing Figs.
[52] U.S. Cl. .................................................. 219/121, 29/481
[51] Int. Cl. ................................................... B23k 15/00
[50] Field of Search .......................................... 219/137, 160, 121, 117; 29/481, 482, 487, 488

[56] References Cited
UNITED STATES PATENTS

| 2,366,579 | 1/1945 | Von Ahrens | 285/111 |
| 2,987,610 | 6/1961 | Steigerwald | 219/117 |
| 3,195,929 | 7/1965 | Ott | 285/22 |
| 3,351,734 | 11/1967 | Arikawa et al. | 219/137 |
| 3,365,566 | 1/1968 | Kuder | 219/160 |

Primary Examiner—J. V. Truhe
Assistant Examiner—R. O'Neill
Attorneys—A. T. Stratton, John L. Stoughton and Z. L. Dermer ABSTRACT: A method for butt welding with electron beams wherein an elongated or hollow cylindrical backup member is placed below the edges to be butt welded to receive the porous portion of the weld bead which backup member and porous portion which may be subsequently cut away without undercutting the work and without leaving remnants of the backup member on the work.

FIG. 2

METHOD FOR REMOVAL OF THE POROUS PORTION OF A BUTT WELD

The present invention was made in the course of, or under U.S. Government Contract No. AT-11-1-GEN-14.

BACKGROUND OF THE INVENTION

Sound butt welds free from porosity cannot be made by the electron beam welding process unless the joint thickness is excessively penetrated and the porous portion of the weld placed below the finished surface of the underbead side of the weld. The elimination of the porous portion of the weld is normally accomplished by either allowing the underbead to hang freely below the lower face of the butt joint or by welding into a backup strip clamped to the underbead face of the joint. Neither technique is satisfactory since allowing the underbead to hang free causes undercutting of the edges of the molten underbead and welding into a backup strip results in a weldment from which removal of the backup strip cannot be accomplished without either cutting into the finished face of the item being welded or leaving remnants of the backup member in the form of very close fitting slivers of the backup bar.

FIELD OF THE INVENTION

It is an object of this invention to eliminate the foregoing disadvantages and to provide an apparatus for and a technique for providing sound butt welds free of porosity and made by the electron beam welding process.

Another object of the invention is to provide a process in which a cylindrical backup member is used to receive the porous portion of the weld and which backup member and porous portion may be removed from the finished surface without undercutting or leaving portions of a backup strip in the article being welded.

Figure 2:
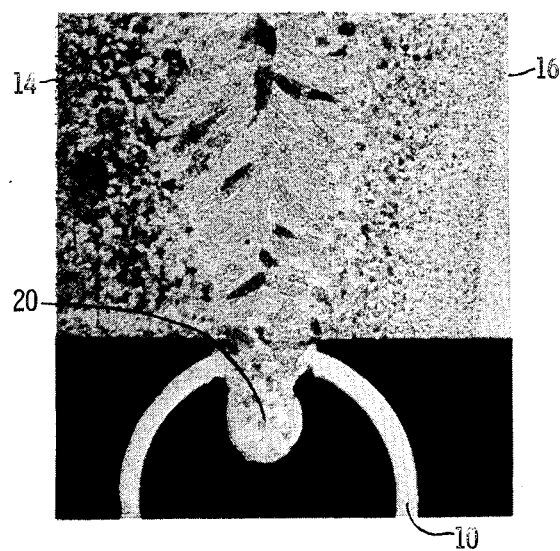

Other objects of the invention will be apparent from the description, the appended claims and the accompanying drawings, in which:

FIG. 1 illustrates the undercutting at the edges of the molten underbead when no backup strip is removed; and FIG. 2 illustrates a butt weld which has been made in accordance with the teaching of this invention showing the porous portion of the weld bead deposited in the tube or hollow cylindrical member and which may be easily removed without leaving slivers of the backup bar or undercutting the workpiece.

Referring to the drawings by characters of reference the numeral 1 indicates the meniscuslike porous portion of the weld which extends below the lower surface of the butt weld joint. Undercut portions 2 and 4 exist at either side of the solidified material between the members 6 and 8.

In accordance with the teachings of this invention a hollow cylindrical backup member 10 is positioned against the lower surface of the edge portions of the two members 14 and 16 which are to be butt welded together by means of the impingement of an electron beam or other corpuscular beam directed thereto from a suitable source, not shown, against the upper surface of the members 14 and 16. A suitable apparatus for performing this process in the atmosphere is illustrated in U.S. Pat. No. 2,899,556, J. Schopper and Schumacker.

The corpuscular beam is of a very narrow width and heats the immediate edge portions of the two members whereby the heated material melts. Some of the material flows downward into the cylindrical backup strip or member 10 as indicated by the reference numeral 20. After the joint is welded, the portion 20 and backup member 10 may be removed by a machining process without any undercutting of the lower surface of the members 14 and 16.

Since numerous changes may be made in the above-described method and different embodiments of the invention may be made without departing from the spirit thereof, it is intended that all matter contained in the foregoing description or shown in the accompanying drawings shall be interpreted as illustrative and not in a limiting sense.

I claim:

1. The method of butt welding two members together comprising the steps of placing an end portion of each of the two members which are to be welded in juxtaposition with the joint formed between said end portions extending substantially vertically and the lower edge of said joint defining a straight line; placing a hollow cylindrical backup member against said lower edge of said joint with the axis of the backup member extending parallel to said lower edge; directing a corpuscular beam through the entire distance of the substantially vertical dimension of said joint; moving said beam along the longitudinal dimension of said joint to melt the juxtaposed end portions, and thereafter removing said backup member and the portions of the weld bead which may form on the lower surfaces of the two members and extend through said backup member.